US012321612B2

(12) United States Patent
Buban

(10) Patent No.: US 12,321,612 B2
(45) Date of Patent: Jun. 3, 2025

(54) SPACE EFFICIENT DATA INTEGRITY CHECK

(71) Applicant: Microsoft Technology Licensing, LLC, Redmond, WA (US)

(72) Inventor: Garret Buban, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2 days.

(21) Appl. No.: 18/320,680

(22) Filed: May 19, 2023

(65) Prior Publication Data
US 2024/0385757 A1 Nov. 21, 2024

(51) Int. Cl.
G06F 3/06 (2006.01)
(52) U.S. Cl.
CPC .......... G06F 3/0619 (2013.01); G06F 3/0644 (2013.01)
(58) Field of Classification Search
CPC ............. G06F 11/1004; G06F 11/1048; G06F 11/1068; G06F 11/1076; G06F 3/0619; G06F 3/0644
See application file for complete search history.

(56) References Cited

U.S. PATENT DOCUMENTS

| 5,925,138 | A | * | 7/1999 | Klein | ............ G11C 29/80 714/6.13 |
| 6,484,269 | B1 | * | 11/2002 | Kopylovitz | ......... G06F 11/1076 714/E11.034 |
| 2008/0282105 | A1 | | 11/2008 | Deenadhayalan | |
| 2010/0217752 | A1 | * | 8/2010 | Deenadhayalan | .. G06F 11/1076 707/690 |
| 2011/0302474 | A1 | | 12/2011 | Goss | |
| 2015/0286524 | A1 | | 10/2015 | Trantham | |
| 2023/0063804 | A1 | * | 3/2023 | Kim | ............ G06F 11/1068 |
| 2023/0359523 | A1 | * | 11/2023 | Sonnekalb | .......... G06F 11/1004 |

FOREIGN PATENT DOCUMENTS

WO      WO-02089133 A2 * 11/2002 .......... G06F 11/1076

OTHER PUBLICATIONS

International Search Report and Written Opinion received for PCT Application No. PCT/US2024/026716, Aug. 22, 2024, 13 pages.

* cited by examiner

*Primary Examiner* — Shelly A Chase
(74) *Attorney, Agent, or Firm* — Weaver IP L.L.C.

(57) ABSTRACT

Space efficient data integrity checks are disclosed herein. During a write operation of a first data to a location, a combined integrity value is calculated based on a first data integrity value of the first data and the location. The first data is stored at the location along with the combined integrity value. During a read operation of the first data, the first data is read from the location along with the combined integrity value, and a second data integrity value is calculated for the read first data. Data corruption and/or location errors can be determined based on the second data integrity value, the location, and the combined integrity value.

20 Claims, 6 Drawing Sheets

SPACE EFFICIENT DATA INTEGRITY CHECK

BACKGROUND

Data integrity refers to the quality of data being complete, consistent, and free from errors. In contrast, data corruption refers to errors in data that make the data incomplete, inaccurate, or inconsistent, and may occur when data is written to, read, stored, transmitted, or processed. Data corruption may occur due to various factors such as human error, software bugs, hardware failures, or malicious attacks. Various data integrity checks exist to detect data corruption and/or ensure data integrity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for space efficient data integrity checks. During a write operation of a first data to a location, a combined integrity value is calculated based on a first data integrity value of the first data and the location. The first data is stored at the location along with the combined integrity value. During a read operation of the first data, the first data is read from the location along with the combined integrity value, and a second data integrity value is calculated for the read first data. Data corruption and/or location errors can be determined based on the second data integrity value, the location, and the combined integrity value.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
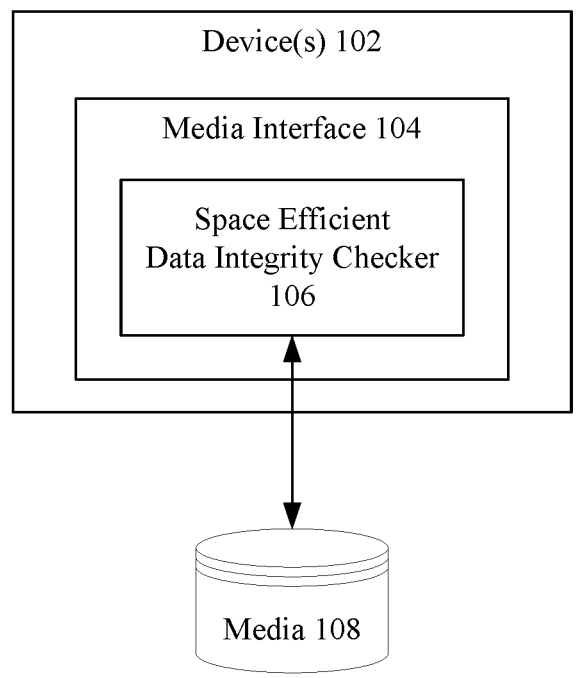
FIG. 1 shows a block diagram of an example system for efficient data integrity validation, according to an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As discussed in the Background Section above, data corruption is present when data is incomplete, inaccurate, or inconsistent due to various factors such as human error, software bugs, hardware failures, or malicious attacks. For example, data corruption may occur due to the gradual deterioration of digital data over time due to various factors such as hardware obsolescence, software incompatibility, bit rot, and media degradation. As data is stored on physical media such as hard drives, CDs, and tapes, the media itself can degrade, leading to loss of data. This is known in the art as data rot, data decay, or data degradation.

Protection against data rot may be achieved by, for example, calculating and comparing a checksum value for the data. A checksum is a data block (a data value of a fixed length) derived from original data (by a mathematical algorithm) for the purpose of detecting errors in the original data. In examples, a checksum value may be calculated using an algorithm such as CRC (Cyclic Redundancy Check) or MD5 (Message Digest 5), which generate a unique value based on the data being checked. The generated checksum may then be stored alongside the data or transmitted with the data to ensure that it remains intact during transmission or storage. For instance, when the data is retrieved or received, the checksum may be recalculated (as a second checksum) using the same algorithm and compared with the original checksum (the first checksum). For example, the second checksum may be later generated based on the original data. This second checksum value can then be compared with the first checksum to detect whether the data has changed since the first checksum was calculated, which may occur due to data corruption. If the checksums match, it is assumed that the data has not been altered or corrupted during transmission or storage. If the checksums do not match, it indicates that the data has been corrupted or altered, and corrective action can be taken.

Data corruption may further include data miswrites and data misreads that may occur when data is written or read incorrectly due to various factors such as, for example, hardware malfunctions, or software bugs. For example, if a hard drive writes a data block to an incorrect location, the data may become unreadable or inaccessible, leading to data loss. Similarly, data misreads may occur when data is read from the wrong location, leading to incorrect or incomplete data, and/or resulting in data corruption.

Unlike data rot, a checksum cannot protect against data miswrites and data misreads. When a data miswrite occurs, the data, along with its checksum, are stored at the wrong location. A read request to the correct location, where the data should be located, would return unrelated data, along with a corresponding checksum. Performing checksum validation on the unrelated data based on the corresponding checksum may indicate that the read data is valid. However, the data is incorrect because the requested data was never written to the correct location. Similarly, a data miswrite may return data from a different location than what is indicated in a read request. Checksum validation on the data from the different location may also indicate that the read data is valid. However, the read data is incorrect because it is not the requested data.

Protecting against data miswrites and data misreads may be achieved by, for example, storing location information along with the data and/or storing the checksum value separately from the data. Storing location information with the data allows location information associated read request to be compared against the location information associated with the data returned by the read operation. For example, the industry standard T10 relating to data storage includes a Data Integrity Field (DIF) that includes a 16-bit GUARD tag for storing a CRC value, a 32-bit REFERENCE tag for storing a logical block address (LBA), and a 16-bit APPLICATION tag for user defined content. In the T10 standard, the 64-bit DIF is divided among the GUARD tag, REFERENCE tag, and APPLICATION tag, resulting in reduced data integrity protection when compared to using a 64-bit CRC.

In embodiments disclosed herein, a first data integrity value (e.g., 64-bit CRC) is combined using a non-destructive operation (e.g., exclusive or (XOR), addition, subtraction, etc.) with one or more second integrity values (e.g., location, timestamp, size, etc.) to form a combined integrity value that provides space efficient data integrity protection. For example, the full length of the combined integrity value (e.g., 64 bits) may be used for a plurality of data integrity checks (e.g., data rot, data miswrites, data misreads, etc.) without sacrificing any protection provided by the individual integrity values (e.g., 64-bit CRC, 64-bit LBA, timestamp, size, etc.). The combined integrity value, while incorporating multiple protective factors (e.g., CRC, location, etc.), provides the same or better protection as individual integrity values of the same length, resulting in a space efficient use of the bits available for data integrity checks. As used herein, a "non-destructive operation" is a mathematical operation on data that generates a result from which the data may be recovered by performing the same or another mathematical operation on the result.

For example, a 64-bit CRC and the LBA of the data may be combined using XOR operation into a 64-bit combined integrity value that provides protection against data miswrites and data misreads with no reduction in the protection provided by the 64-bit CRC. In embodiments, the combined integrity value is stored along with the data and replaces the first data integrity value (e.g., CRC). Storing the combined integrity value along with the data allows for the retrieval of both the data and the combined integrity value using a single read operation. During a read request, the data and the combined integrity value may be retrieved. In embodiments, the combined integrity value is recalculated based on the retrieved data and compared to the retrieved combined integrity value. A mismatch between the recalculated combined integrity value and the retrieved combined integrity value may indicate that the retrieved data is corrupt, a data miswrite occurred, and/or a data misread occurred. While the combined integrity value provides an indication that an error has occurred, the combined integrity value does not provide a direct indication of the type of error that occurred. However, other means may be available to pinpoint the type of error and remediate the error. For example, when a read request results in a mismatch in combined integrity values, a backup copy of the data may be accessed to pinpoint the type of error that occurred and/or to fulfill the read request.

These and further embodiments are disclosed herein that enable the functionality described above and further such functionality. Such embodiments are described in further detail as follows.

For instance, FIG. 1 shows a block diagram of an example system 100 for efficient data integrity validation, in accordance with an embodiment. As shown in FIG. 1, system 100 may include one or more devices 102 that include a media interface 104. Media interface 104 further includes a space efficient data integrity checker 106. System 100 may further include a media 108.

Devices(s) 102 may include any computing device suitable for performing functions that are ascribed thereto in the following description, as will be appreciated by persons skilled in the relevant art(s), including those mentioned elsewhere herein or otherwise known. Various example implementations of devices(s) 102 are described below in reference to FIG. 6 (e.g., computing device 602, network-based server infrastructure 670, and/or on-premises servers 692).

Media interface 104 may include any interface suitable for performing functions that are ascribed thereto in the following description, as will be appreciated by persons skilled in the relevant art(s), including those mentioned elsewhere herein or otherwise known. In embodiments, media interface 104 facilitates the writing of data to media 108 and/or the reading of data from media 108. Media interface 104 will be described in greater detail below in conjunction with FIG. 2.

Space efficient data integrity checker 106 generates space efficient combined integrity values using non-destructive operations during data writes and performs data integrity checks based on the space efficient combined integrity values during data reads. Space efficient data integrity checker 106 will be described in greater detail below in conjunction with FIG. 2.

Media 108 may include any media suitable for performing functions that are ascribed thereto in the following description, as will be appreciated by persons skilled in the relevant art(s), including those mentioned elsewhere herein or otherwise known. Various example implementations of media 108 are described below in reference to FIG. 6 (e.g., storage 620, wireless modem(s) 660, wired interface(s) 680, and/or storage 694).

Figure 2:
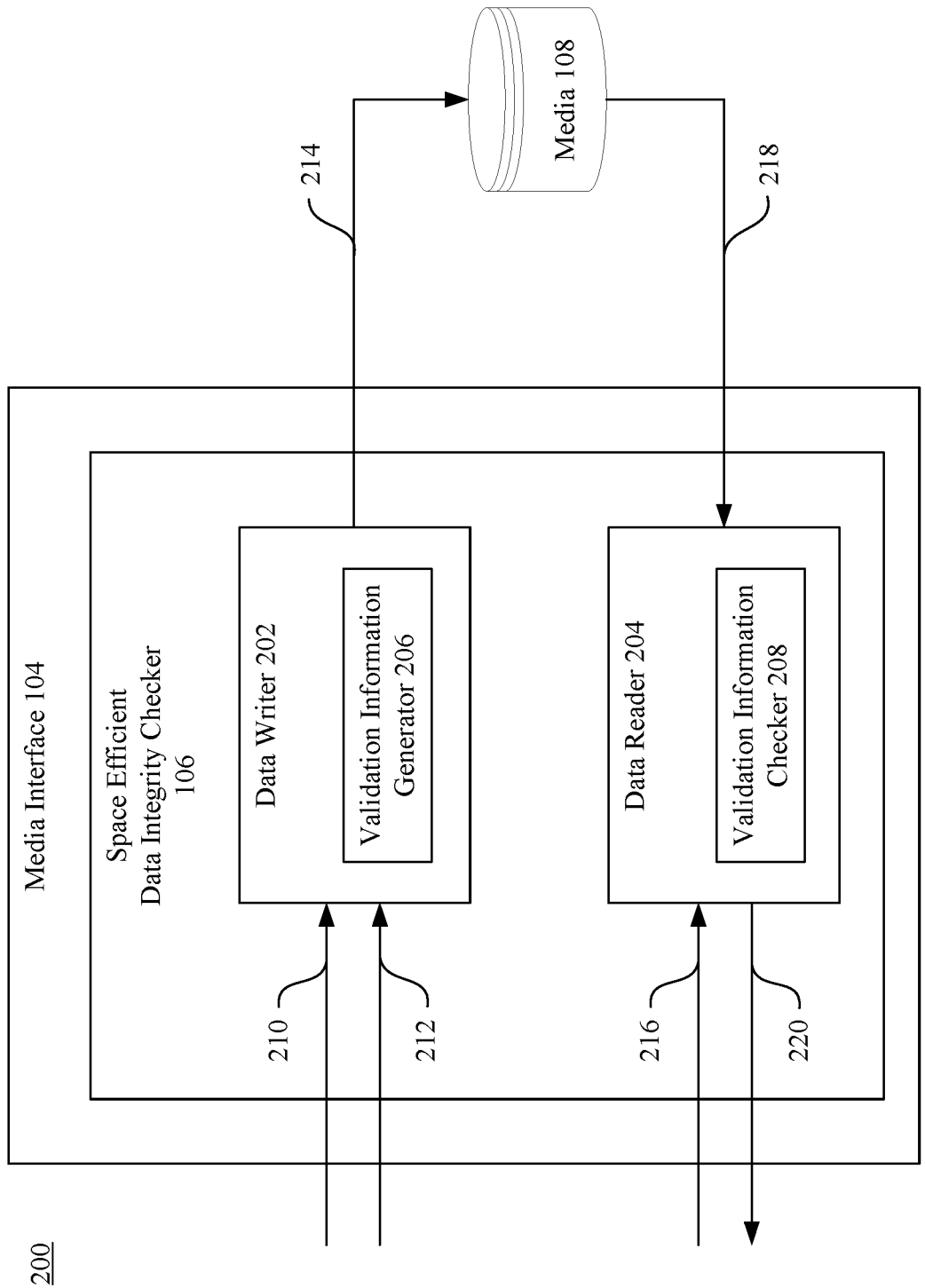
FIG. 2 shows a block diagram of an example system for efficient data integrity validation, according to an embodiment.

System 100 of FIG. 1 may be configured in various ways, in embodiments. For instance, in an embodiment, system 100 may perform data integrity checks based on validation information, such as shown in FIG. 2. FIG. 2 shows a block diagram of an example system 200 for efficient data integrity validation, according to an embodiment. As shown in FIG. 2, system 200 includes media interface 104, space efficient data integrity checker 106, and media 108 of FIG. 1. In an embodiment of FIG. 2, space efficient data integrity checker 106 further includes a data writer 202 and a data writer 204. As shown in FIG. 2, data writer 202 may further include a validation information generator 206, and data writer 204 may further include a validation information checker 208. These features of system 200 are described in further detail as follows.

Data writer 202 may be configured to handle write requests. In embodiments, data writer 202 receives write data 210, and a write location 212. In an embodiment, write data 210 may include both data and a first data integrity value (e.g., checksum, CRC, etc.) associated with the data. In such an embodiment, data writer 202 may extract the first data integrity value from write data 210 and employ validation information generator 206 to generate a combined integrity value based on the first data integrity value and the write location 212. In an embodiment, data writer 202 may form combined write data 214 by overwriting the first data integrity value (e.g., checksum, CRC, etc.) in write data 210 with the combined integrity value. Data writer 202 may store combined write data 214 in media 108 at write location 212.

In another embodiment, write data 210 may include only the data without the first data integrity value. In such an embodiment, data writer 202 may calculate the first data integrity value based on write data 210 and employ validation information generator 206 to generate a combined integrity value based on the calculated first data integrity value and the write location 212. In an embodiment, data writer 202 may form combined write data 214 by combining write data 210 with the combined integrity value, by, for example, prepending or appending the combined integrity value to write data 210. Data writer 202 may store combined write data 214 in media 108 at write location 212.

In embodiments, data writer 202 may receive one or more additional integrity values (e.g., temporal information, size, signature, identity, etc.) and generate the combined integrity value based additionally on the additional integrity value(s). The inclusion of the additional data integrity value(s) allow for protection against other types of data integrity protection (e.g., version control, shared access, ownership, etc.) and user-defined integrity rules and constraints.

Data reader 204 may be configured to handle read requests. In embodiments, data reader 204 receives a read request containing a read location 216. Data reader 204 may read the data from read location 216 in media 108 and receive combined read data 218. In an embodiment, combined read data 218 may include a retrieved data portion and retrieved combined integrity value portion. Furthermore, data reader 204 may employ validation information checker 208 to perform data integrity checks on combined read data 218. If combined read data 218 passes validation, data reader 204 may return the retrieved data portion of combined read data 218 as output 220, In an embodiment, data reader 204 may generate output 220 by appending or prepending, to the retrieved data portion, a second data integrity value (e.g., checksum, CRC, etc.) associated with the retrieved data portion. In an embodiment, the second data integrity value may be calculated based on a retrieved data portion using a known algorithm (e.g., checksum, CRC, MD5, etc.). For instance, the second data integrity value may be calculated by XORing the retrieved combined integrity value portion with the read location 216 and the additional integrity value(s), if any.

In embodiments, data reader 204 may perform an action responsive to detecting an error in combined read data 218. In embodiments, data reader 204 may return an error code or message as output 220. In embodiments, data reader 204 may retrieve a backup copy of the requested data from a backup location (not shown) and return the backup copy as output 220. Providing a backup copy responsive to a failed data integrity check improves data availability.

Validation information generator 206 may generate a combined integrity value based on one or more integrity values associated with write data 210. In embodiments, validation information generator 206 may generate a combined integrity value by combining a first data integrity value (e.g., checksum, CRC, etc.) for the write data 210 with write location 212 using a non-destructive operation, such as, but not limited to, an XOR operation, a subtraction operation, and/or an addition operation. As described above, the first data integrity value may be received as part of write data 210 or may be calculated by data write 202 and/or validation information generator 206 based on write data 210. In embodiments, validation information generator may generate a combined integrity value based additional integrity value(s) (e.g., timestamp, size, signature, identifier, etc.) by combining the first data integrity value, the write location, and the additional integrity value(s) using the non-destructive operation.

Validation information checker 208 may perform data integrity checks on combined read data 218. In embodiments, validation information checker 208 may separate combined read data 218 into a retrieved data portion and retrieved combined integrity value portion. In embodiments, validation information checker 208 may calculate a second data integrity value (e.g., checksum, CRC, etc.) based on the retrieved data portion. In embodiments, validation information checker 208 may perform data integrity checks based on the second data integrity value, read location 216, and/or the retrieved combined integrity value.

In embodiments where combined integrity values are generated using an XOR operation, validation information checker 208 may perform validation using an XOR operation. In embodiments, validation information checker 208 may generate a second combined integrity value by XORing the second data integrity value with read location 216 and the additional integrity value(s), if any. Validation information checker 208 may then compare the retrieved combined integrity value with the second combined integrity value. In embodiments, comparison may be performed by XORing the retrieved combined integrity value with the second combined integrity value and determining whether the result is zero. In embodiments, comparison may be performed by subtracting the retrieved combined integrity value from the second combined integrity value and determining whether the result is zero. In embodiments, comparison may be performed by subtracting the second combined integrity value from the retrieved combined integrity value and determining whether the result is zero. In embodiments, comparison may be performed by directly comparing the retrieved combined integrity value with the second combined integrity value to determine whether they are identical. In embodiments, validation information checker 208 may perform validation without directly calculating the second combined integrity value. For example, validation information checker 208 may XOR the second data integrity value, read location 216, and retrieved combined integrity value in any order, and determine whether the result is zero. In embodiments where the combined integrity value is generated based on additional integrity value(s), validation information checker 208 may include the additional integrity value(s) in the XOR operations.

In embodiments where combined integrity values are generated using an addition operation, validation information checker 208 may perform validation using a subtraction operation. In embodiments, validation information checker 208 may generate a second combined integrity value by adding the second data integrity value, read location 216 and the additional integrity value(s), if any. Validation information checker 208 may then compare the retrieved combined integrity value with the second combined integrity value. In embodiments, comparison may be performed by XORing the retrieved combined integrity value with the second combined integrity value and determining whether the result is zero. In embodiments, comparison may be performed by subtracting the retrieved combined integrity value from the second combined integrity value and determining whether the result is zero. In embodiments, comparison may be performed by subtracting the second combined integrity value from the retrieved combined integrity value and determining whether the result is zero. In embodiments, comparison may be performed by directly comparing the retrieved combined integrity value with the second combined integrity value to determine whether they are identical. In embodiments, validation information checker 208 may perform validation without directly calculating the second combined integrity value. For example, validation information checker 208 may subtract the second data integrity value, read location 216, and the additional integrity value(s), if any, from the retrieved combined integrity value in any order, and determine whether the result is zero.

Figure 3:
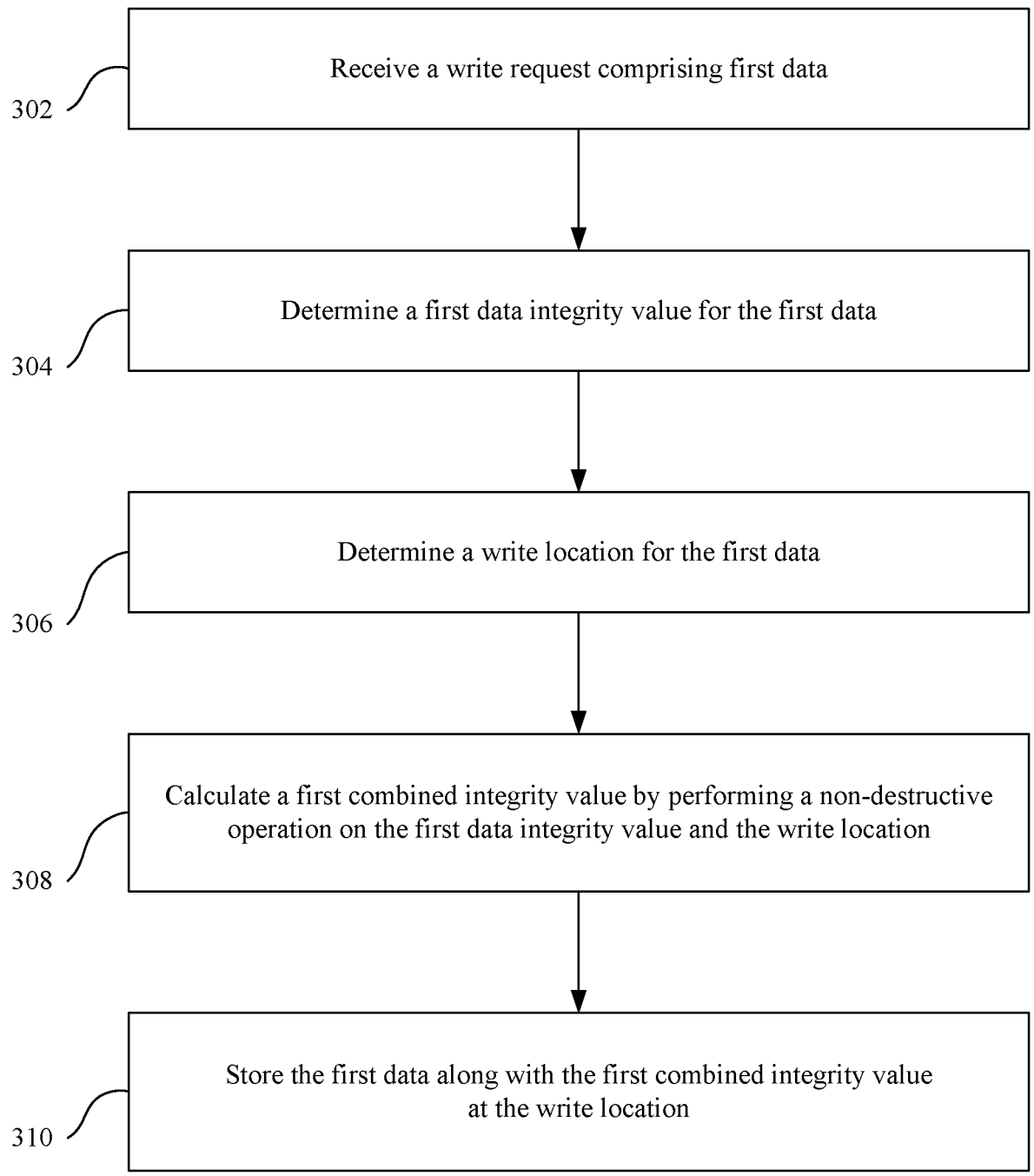
FIG. 3 depicts a flowchart of an example method for writing data with data integrity validation information, according to an embodiment.

Embodiments described herein may operate in various ways to write data with a combined integrity value. For instance, FIG. 3 depicts a flowchart 300 of an example method for writing data with combined data integrity validation information, according to an embodiment. Device(s) 102 of FIGS. 1 and 2, data writer 202 of FIG. 2, and/or validation information generator 206 of FIG. 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, a write request comprising first data is received. For example, data writer 202 may receive a write request comprising write data 210. As described above, in embodiments, write data 210 may include data, or data and a first data integrity value In step 304, a first data integrity value is determined for the first data. For example, in embodiments, data writer 202 may receive the first data integrity value with write data 210, as part of the write request and data writer 202 may determine the first data integrity value by extracting it from write data 210. In an embodiment, write data 210 may not include the first data integrity value. In such an embodiment, data writer 202 and/or validation information generator 206 may determine the first data integrity value based on write data 210 using known algorithms (e.g., checksum, CRC, MD5, etc.).

In step 306, a write location is determined for the first data. For example, in embodiments, data writer 202 may receive write location 212 as part of the write request. In embodiments, data writer 202 may determine the write location by mapping, calculating, and/or performing a lookup based on a value (e.g., identifier, address, etc.) provided with the write request.

In step 308, a first combined integrity value is calculated by performing a non-destructive operation on the first data integrity value and the write location. For example, validation information generator 206 may calculate the first combined integrity value by combining the first data integrity value and the write location using a non-destructive operation. In embodiments, validation information generator 206 may calculate the first combined integrity value by XORing or adding the first data integrity value with the write location.

In step 310, the first data is stored along with the first combined integrity value at the write location. For example, data writer 202 may store combined write data 214 in media 108 at write location 212. As described above, in embodiments where write data 210 included the first data integrity value (e.g., checksum, CRC, etc.), combined write data 214 is formed by overwriting the first data integrity value in write data 210 with the combined integrity value. In embodiments where write data 210 did not include the first data integrity value, combined write data 214 is formed by appending or prepending the combined integrity value to write data 210.

Figure 4:
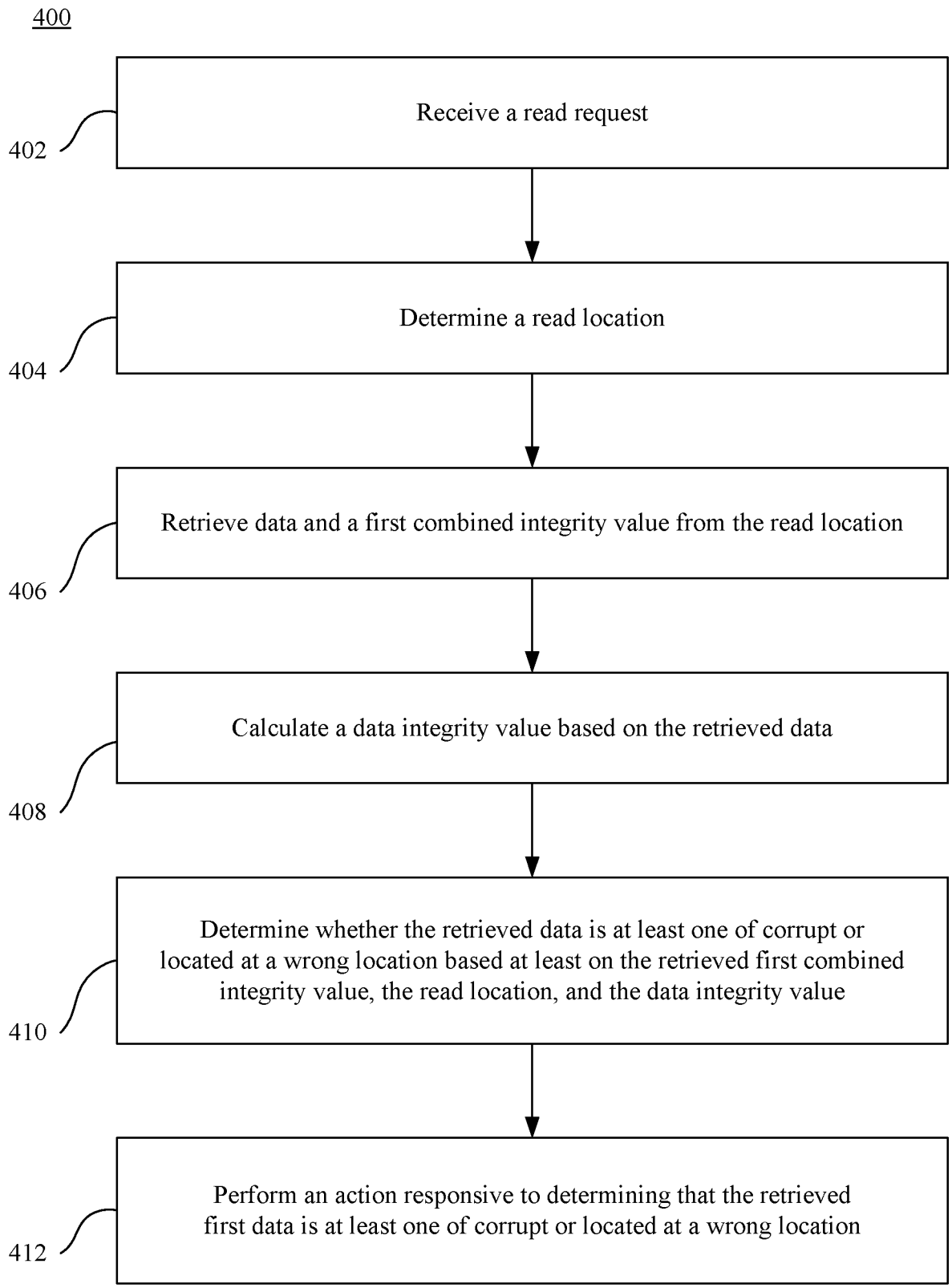
FIG. 4 depicts a flowchart of an example method for validating data during a read operation based on data integrity validation information, according to an embodiment.

Embodiments described herein may operate in various ways to validate data with a combined integrity value. For instance, FIG. 4 depicts a flowchart 400 of an example method for validating data during a read operation based on combined data integrity validation information, according to an embodiment. Device(s) 102 of FIGS. 1 and 2, data reader 204 of FIG. 2, and/or validation information checker 208 of FIG. 2 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1 and 2 for illustrative purposes.

Flowchart 400 starts at step 402. In step 402, a read request is received. For example, data reader 204 may receive a read request.

In step 404, a read location is determined. For example, in embodiments, data reader 204 may receive read location 216 as part of the read request. In embodiments, data writer 202 may determine the read location by mapping, calculating, and/or performing a lookup based on a value (e.g., identifier, address, etc.) provided with the read request.

In step 406, data and a first combined integrity value is retrieved from the read location. For example, data reader 204 may retrieve combined read data 218 from read location 216 in media 108.

In step 408, a data integrity value is calculated based on the retrieved data. For example, validation information checker 208 may calculate a second data integrity value based on the data portion of combined read data 218. In embodiments, validation information checker may calculate the second data integrity value using known algorithms (e.g., checksum, CRC, MD5, etc.).

In step 410, it is determined whether the retrieved data is corrupt or located at a wrong location based at least on the retrieved first combined integrity value, the read location, and the data integrity value. For example, validation information checker 208 may determine whether combined read data 218 is corrupted or located at a wrong location based on the combined integrity value portion of combined read data 218, read location 216, and the second data integrity value. As discussed above, in embodiments, validation information checker 208 may perform validation by XORing the combined integrity value portion of combined read data 218, read location 216, and the second data integrity value in any order, and determine whether the result is zero. In embodiments, validation information checker 208 may perform validation by subtracting the second data integrity value and read location 216 from the combined integrity value portion of combined read data 218 in any order, and determine whether the result is zero.

In step 412, an action may be performed responsive to determining that the retrieved first data is corrupt or located at a wrong location. For example, data reader 204 may perform an action responsive to determining that the retrieved first data is corrupt or located at a wrong location. As discussed above, data reader 204 may perform an action responsive to detecting an error in combined read data 218. In embodiments, data reader 204 may return an error code or message as output 220. In embodiments, data reader 204 may retrieve a backup copy of the requested data from a backup location (not shown) and return the backup copy as output 220. In embodiments, data reader 204 may employ validation information checker 208 to validate the backup copy prior to returning the backup copy.

Figure 5:
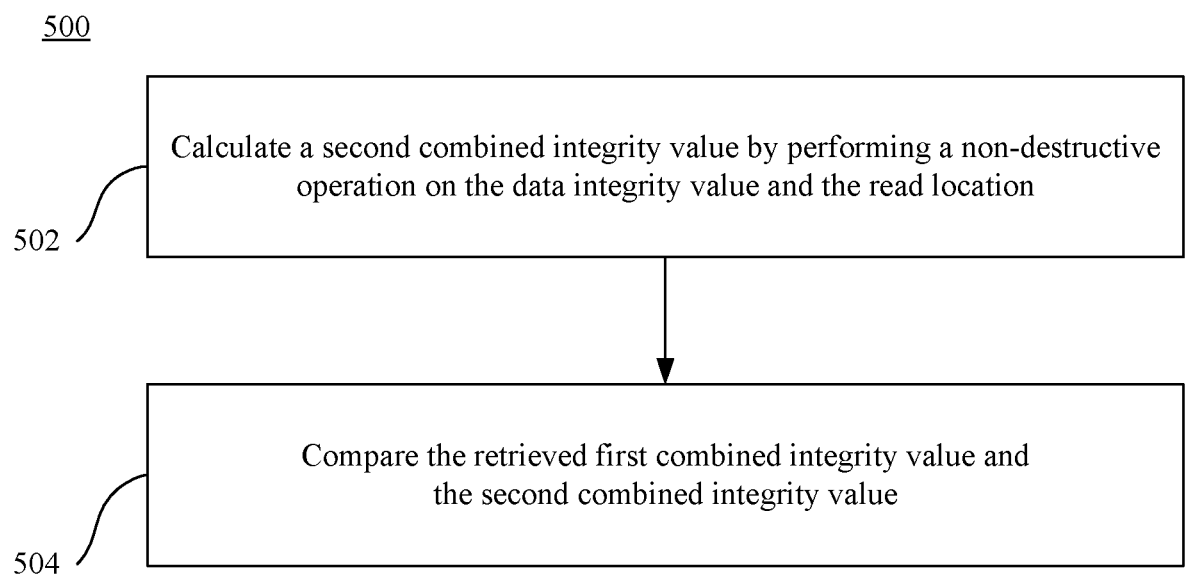
FIG. 5 depicts a flowchart of an example method for validating data integrity validation information, according to an embodiment.

Embodiments described herein may operate in various ways to validate data with a combined integrity value. For instance, FIG. 5 depicts a flowchart 500 of an example method for validating data during a read operation based on combined data integrity validation information, according to an embodiment. Device(s) 102 of FIGS. 1 and 2, data reader 204 of FIG. 2, and/or validation information checker 208 of FIG. 2 may operate according to flowchart 500, for example. In embodiments, step 410 of flowchart 400 may comprise the method of flowchart 500. Flowchart 500 is described as follows with respect to FIGS. 1 and 2 for illustrative purposes.

Flowchart 500 starts at step 502. In step 502, a second combined integrity value is calculated by performing a non-destructive operation on the data integrity value and the read location. For example, in embodiments, validation information checker 208 may generate a second combined integrity value by XORing the second data integrity value with read location 216. In embodiments, validation information checker 208 may generate a second combined integrity value by adding the second data integrity value and read location 216.

In step 504, the retrieved first combined integrity value is compared to the second combined integrity value. For example, validation information checker 208 may compare the combined integrity value portion of combined read data 218 with the second combined integrity value. In embodiments, comparison may be performed by XORing the combined integrity value portion of combined read data 218 with the second combined integrity value and determining whether the result is zero. In embodiments, comparison may be performed by subtracting the combined integrity value portion of combined read data 218 from the second combined integrity value and determining whether the result is zero. In embodiments, comparison may be performed by subtracting the second combined integrity value from the combined integrity value portion of combined read data 218 and determining whether the result is zero. In embodiments, comparison may be performed by directly comparing the combined integrity value portion of combined read data 218 with the second combined integrity value to determine whether they are identical.

III. Example Mobile Device and Computer System Implementation

The systems and methods described above in reference to FIGS. 1-5, including device(s) 102, media interface 104, space efficient data integrity checker 106, media 108, data writer 202, data reader 204, validation information generator 206, validation information checker 208, and/or each of the components described therein, and the steps of flowcharts 300, 400, and/or 500 may be implemented in hardware, or hardware combined with one or both of software and/or firmware. For example device(s) 102, media interface 104, space efficient data integrity checker 106, media 108, data writer 202, data reader 204, validation information generator 206, validation information checker 208, and/or each of the components described therein, and the steps of flowcharts 300, 400, and/or 500 may be each implemented as computer program code/instructions configured to be executed in one or more processors and stored in a computer readable storage medium. Alternatively, device(s) 102, media interface 104, space efficient data integrity checker 106, media 108, data writer 202, data reader 204, validation information generator 206, validation information checker 208, and/or each of the components described therein, and the steps of flowcharts 300, 400, and/or 500 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 6:
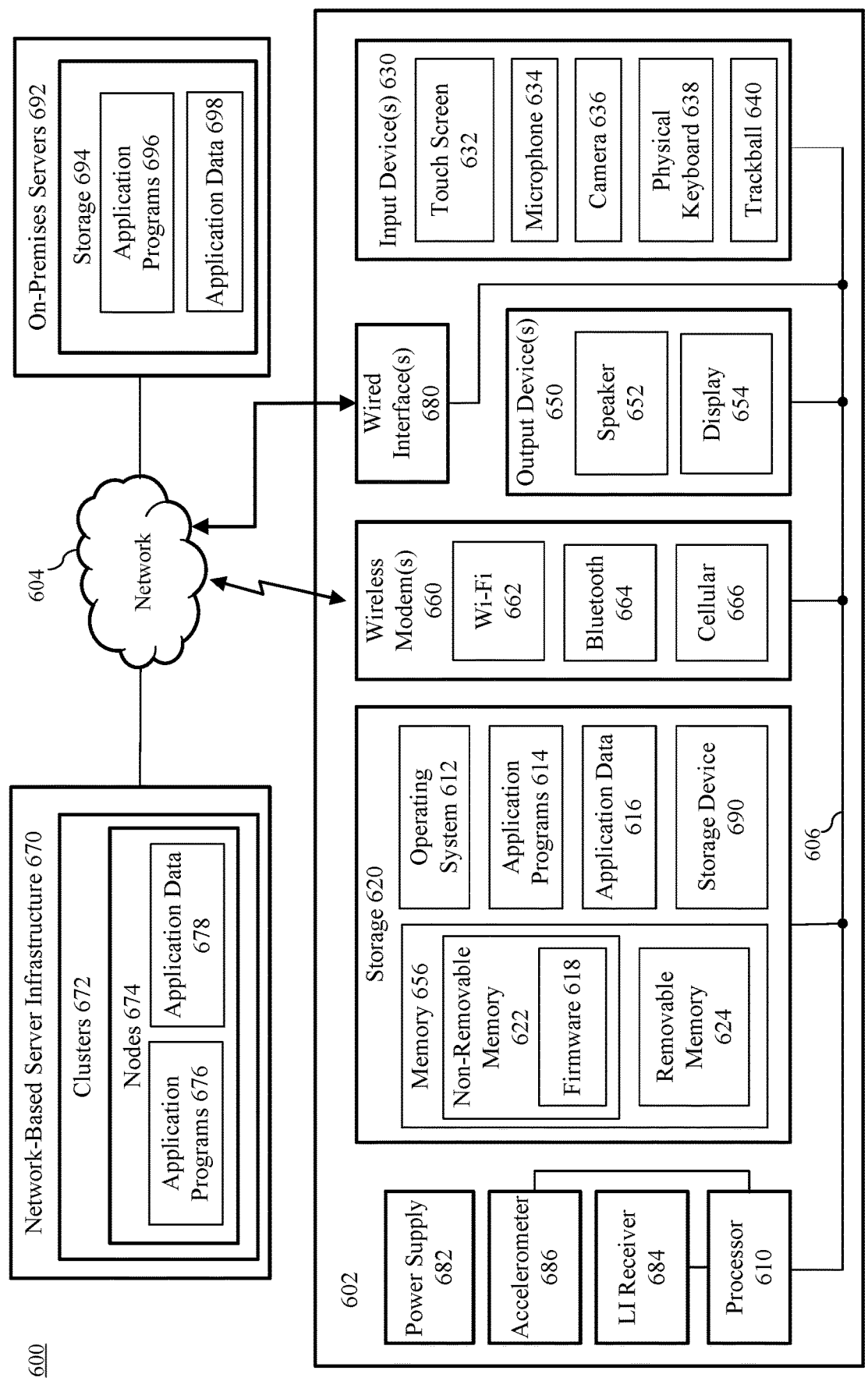
FIG. 6 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 6. FIG. 6 shows a block diagram of an exemplary computing environment 600 that includes a computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for case of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more of device(s) 102, media interface 104, space efficient data integrity checker 106, media 108, data writer 202, data reader 204, validation information generator 206, validation information checker 208, and/or each of the components described therein, along with any components and/or sub-components thereof, as well as the flowcharts/flow diagrams (e.g., flowcharts 300, 400, and/or 500) described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi 662 modem (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc. or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

In an embodiment, a system includes: a processor; a memory device that stores program code structured to cause the processor to: receive a read request; determine a read location for the read request; retrieve data and a first combined integrity value from the read location; calculate a second data integrity value based on the retrieved data; determine whether the retrieved data is at least one of corrupt or located at a wrong location by performing an exclusive or (XOR) operation on at least two of: the retrieved first combined integrity value, the read location, or the second data integrity value; and perform an action responsive to determining that the retrieved data is at least one of corrupt or located at a wrong location.

In an embodiment, the computer-readable instructions, when executed by the processor, further cause the processor to: return, responsive to determining that the retrieved data is not at least one of corrupt or located at a wrong location, the retrieved data and the second data integrity value as a response to the read request.

In an embodiment, to determine that the retrieved data is at least one of corrupt or located at a wrong location, the program code is further structured to: calculate a second combined integrity value by performing an exclusive or (XOR) operation on the second data integrity value and the read location; and compare the retrieved first combined integrity value and the second combined integrity value.

In an embodiment, to determine that the retrieved data is at least one of corrupt or located at a wrong location, the program code is further structured to at least one of: calculate an exclusive or (XOR) of the retrieved first combined integrity value and the second combined integrity value; calculate an exclusive or (XOR) of the read location and the retrieved first combined integrity value; calculate an exclusive or (XOR) of the second data integrity value and the retrieved first combined integrity value; or determine whether the retrieved first combined integrity value and the second combined integrity value are equal.

In an embodiment, the first combined integrity value is calculated based on a third data integrity value, and calculating the second combined integrity value is further based on a fourth data integrity value that is an expected value of the third data integrity value.

In an embodiment, the third data integrity value or the fourth data integrity value comprise at least: a temporal value associated with the first data; a size of the first data; or a signature associated with the first data.

In an embodiment, a method includes: receiving a write request comprising first data; determining a first data integrity value for the first data; determining a write location for the first data; calculating a first combined integrity value by performing a non-destructive operation on the first data integrity value and the write location, wherein the non-destructive operation is an operation that enables at least one of the first data integrity value or the write location to be recovered by performance of a second operation on the first combined integrity value; and storing the first data at the determined write location along with the first combined integrity value.

In an embodiment, the non-destructive operation is an exclusive or (XOR) operation.

In an embodiment, the non-destructive operation is an addition operation.

In an embodiment, the write request further comprises the first data integrity value, and determining the first data integrity value comprises extracting the first data integrity value from the write request.

In an embodiment, the method further includes: receiving a read request for the first data; determining a read location for the first data; retrieving the first data and the first combined integrity value from the read location; calculating a second data integrity value based on the retrieved first data; determining that the retrieved first data is at least one of corrupt or located at a wrong location based at least on the retrieved first combined integrity value, the read location, and the second data integrity value; and performing an action responsive to said determining that the retrieved first data is at least one of corrupt or located at a wrong location.

In an embodiment, determining that the retrieved first data is at least one of corrupt or located at a wrong location includes: calculating a second combined integrity by performing the non-destructive operation on the second data integrity value and the read location; and comparing the retrieved first combined integrity value and the second combined integrity value.

In an embodiment, determining that the retrieved first data is at least one of corrupt or located at a wrong location comprises at least one of: calculating an exclusive or (XOR) of the retrieved first combined integrity value and the second combined integrity value; calculating an exclusive or (XOR) of the read location and the retrieved first combined integrity value; calculating an exclusive or (XOR) of the second data integrity value and the retrieved first combined integrity value; subtracting the read location from the retrieved first combined integrity value; subtracting the second data integrity value from the retrieved first combined integrity value; subtracting the second combined integrity value from the retrieved first combined integrity value; subtracting the retrieved first combined integrity value from the second combined integrity value; or determining whether the retrieved first combined integrity value and the second combined integrity value are equal.

In an embodiment, the method further includes: determining a third data integrity value for the retrieved first data, wherein said calculating the first combined integrity value is further based on the third data integrity value, and said calculating the second combined integrity value is further based on a fourth data integrity value that is an expected value of the third data integrity value.

In an embodiment, the third data integrity value or the fourth data integrity value comprise at least: a temporal value associated with the first data; a size of the first data; or a signature associated with the first data.

In an embodiment, a computer-readable storage medium comprising computer-executable instructions, that when executed by a processor, cause the processor to: receive a read request; determine a read location for the read request; retrieve data and a first combined integrity value from the read location; calculate a second data integrity value based on the retrieved data; determine whether the retrieved data is at least one of corrupt or located at a wrong location by performing an exclusive or (XOR) operation on at least two of: the retrieved first combined integrity value, the read location, and the second data integrity value; or perform an action responsive to determining that the retrieved data is at least one of corrupt or located at a wrong location.

In an embodiment, the computer-readable instructions, when executed by the processor, further cause the processor to: return, responsive to determining that the retrieved data is not at least one of corrupt or located at a wrong location, the retrieved data and the second data integrity value as a response to the read request.

In an embodiment, to determine that the retrieved data is at least one of corrupt or located at a wrong location, the computer-executable instructions, when executed by the processor, further cause the processor to: calculate a second combined integrity value based on the second data integrity value and the read location; and compare the retrieved first combined integrity value and the second combined integrity value.

In an embodiment, to determine that the retrieved data is at least one of corrupt or located at a wrong location, the computer-executable instructions, when executed by the processor, further cause the processor to at least one of: calculate an exclusive or (XOR) of the retrieved first combined integrity value and the second combined integrity value; calculate an exclusive or (XOR) of the read location and the retrieved first combined integrity value; calculate an exclusive or (XOR) of the second data integrity value and the retrieved first combined integrity value; or determine whether the retrieved first combined integrity value and the second combined integrity value are equal.

In an embodiment, the first combined integrity value is calculated based on a third data integrity value, and calculating the second combined integrity value is further based on a fourth data integrity value that is an expected value of the third data integrity value.

In an embodiment, the third data integrity value or the fourth data integrity value comprise at least: a temporal value associated with the first data; a size of the first data; or a signature associated with the first data.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A system comprising:
    a processor;
    a memory device that stores program code structured to cause the processor to:
        retrieve data and a first combined integrity value from a read location;
        calculate a second data integrity value based on the retrieved data;
        determine whether the retrieved data is at least one of corrupt or located at a wrong location by performing an exclusive or (XOR) operation on at least two of: the retrieved first combined integrity value, the read location, or the second data integrity value; and
        perform an action responsive to determining that the retrieved data is at least one of corrupt or located at a wrong location.

2. The system of claim 1, wherein the program code is further structured to cause the processor to:
    receive a read request;
    determine the read location based on the read request; and
    return, responsive to determining that the retrieved data is not at least one of corrupt or located at a wrong location, the retrieved data and the second data integrity value as a response to the read request.

3. The system of claim 1, wherein to determine that the retrieved data is at least one of corrupt or located at a wrong location, the program code is further structured to cause the processor to:
    calculate a second combined integrity value by performing an exclusive or (XOR) operation on the second data integrity value and the read location; and
    compare the retrieved first combined integrity value and the second combined integrity value.

4. The system of claim 3, wherein to determine that the retrieved data is at least one of corrupt or located at a wrong location, the program code is further structured to cause the processor to at least one of:
    calculate an exclusive or (XOR) of the retrieved first combined integrity value and the second combined integrity value;
    calculate an exclusive or (XOR) of the read location and the retrieved first combined integrity value;
    calculate an exclusive or (XOR) of the second data integrity value and the retrieved first combined integrity value; or
    determine whether the retrieved first combined integrity value and the second combined integrity value are equal.

5. The system of claim 3, wherein the first combined integrity value is calculated based on a third data integrity value, and said calculate the second combined integrity value is further based on a fourth data integrity value that is an expected value of the third data integrity value.

6. The system of claim 5, wherein the third data integrity value or the fourth data integrity value comprise at least:
    a temporal value associated with the first data;
    a size of the first data; or
    a signature associated with the first data.

7. A method comprising:
    receiving a write request comprising first data;
    determining a first data integrity value for the first data;
    determining a write location for the first data;
    calculating a first combined integrity value by performing a non-destructive operation on the first data integrity value and the write location, wherein the non-destructive operation is an operation that enables at least one of the first data integrity value or the write location to be recovered by performance of a second operation on the first combined integrity value; and
    storing the first data at the determined write location along with the first combined integrity value.

8. The method of claim 7, wherein the non-destructive operation is an exclusive or (XOR) operation.

9. The method of claim 7, wherein the non-destructive operation is an addition operation.

10. The method of claim 7, wherein the write requests further comprises the first data integrity value, and wherein said determining the first data integrity value comprises extracting the first data integrity value from the write request.

11. The method of claim 7, further comprising:
    receiving a read request for the first data;
    determining a read location for the first data;
    retrieving the first data and the first combined integrity value from the read location;
    calculating a second data integrity value based on the retrieved first data;
    determining that the retrieved first data is at least one of corrupt or located at a wrong location based at least on the retrieved first combined integrity value, the read location, and the second data integrity value; and
    performing an action responsive to said determining that the retrieved first data is at least one of corrupt or located at a wrong location.

12. The method of claim 11, wherein said determining that the retrieved first data is at least one of corrupt or located at a wrong location comprises:
    calculating a second combined integrity value by performing the non-destructive operation on the second data integrity value and the read location; and comparing the retrieved first combined integrity value and the second combined integrity value.

13. The method of claim 12, wherein said determining that the retrieved first data is at least one of corrupt or located at a wrong location comprises at least one of:
calculating an exclusive or (XOR) of the retrieved first combined integrity value and the second combined integrity value;
calculating an exclusive or (XOR) of the read location and the retrieved first combined integrity value;
calculating an exclusive or (XOR) of the second data integrity value and the retrieved first combined integrity value;
subtracting the read location from the retrieved first combined integrity value;
subtracting the second data integrity value from the retrieved first combined integrity value;
subtracting the second combined integrity value from the retrieved first combined integrity value;
subtracting the retrieved first combined integrity value from the second combined integrity value; or
determining whether the retrieved first combined integrity value and the second combined integrity value are equal.

14. The method of claim 12, further comprising:
determining a third data integrity value for the retrieved first data,
wherein said calculating the first combined integrity value is further based on the third data integrity value, and said calculating the second combined integrity value is further based on a fourth data integrity value that is an expected value of the third data integrity value.

15. The method of claim 14, wherein the third data integrity value or the fourth data integrity value comprise at least:
a temporal value associated with the first data;
a size of the first data; or
a signature associated with the first data.

16. A computer-readable storage medium comprising computer-executable instructions, that when executed by a processor, cause the processor to:
retrieve data and a first combined integrity value from a read location;
calculate a second data integrity value based on the retrieved data;
determine whether the retrieved data is at least one of corrupt or located at a wrong location by performing an exclusive or (XOR) operation on at least two of: the retrieved first combined integrity value, the read location, or the second data integrity value; and
perform an action responsive to determining that the retrieved data is at least one of corrupt or located at a wrong location.

17. The computer-readable storage medium of claim 16, wherein the computer-readable instructions, when executed by the processor, further cause the processor to:
receive a read request;
determine the read location based on the read request;
return, responsive to determining that the retrieved data is not at least one of corrupt or located at a wrong location, the retrieved data and the second data integrity value as a response to the read request.

18. The computer-readable storage medium of claim 16, wherein to determine that the retrieved data is at least one of corrupt or located at a wrong location, the computer-executable instructions, when executed by the processor, further cause the processor to:
calculate a second combined integrity value by performing an exclusive or (XOR) operation on the second data integrity value and the read location; and
compare the retrieved first combined integrity value and the second combined integrity value.

19. The computer-readable storage medium of claim 18, wherein to determine that the retrieved data is at least one of corrupt or located at a wrong location, the computer-executable instructions, when executed by the processor, further cause the processor to at least one of:
calculate an exclusive or (XOR) of the retrieved first combined integrity value and the second combined integrity value;
calculate an exclusive or (XOR) of the read location and the retrieved first combined integrity value;
calculate an exclusive or (XOR) of the second data integrity value and the retrieved first combined integrity value; or
determine whether the retrieved first combined integrity value and the second combined integrity value are equal.

20. The computer-readable storage medium of claim 18, wherein the first combined integrity value is calculated based on a third data integrity value, and said calculate the second combined integrity value is further based on a fourth data integrity value that is an expected value of the third data integrity value, wherein the third data integrity value or the fourth data integrity value comprise at least:
a temporal value associated with the first data;
a size of the first data; or
a signature associated with the first data.

* * * * *